Figure 1:
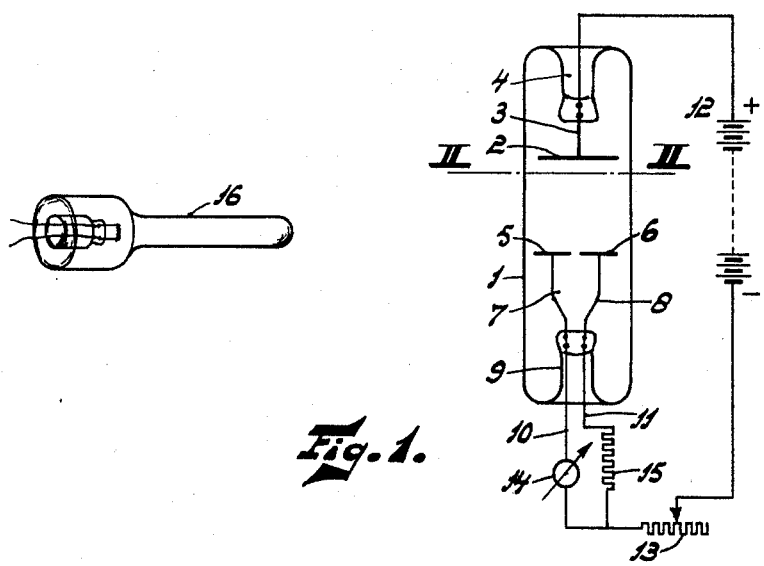

June 5, 1934.                F. M. PENNING ET AL                1,961,708
            SYSTEM FOR INFLUENCING AN ELECTRIC CURRENT BY IRRADIATION
                              Filed March 14, 1932

Patented June 5, 1934

1,961,708

UNITED STATES PATENT OFFICE 1,961,708

SYSTEM FOR INFLUENCING AN ELECTRIC CURRENT BY IRRADIATION

Frans Michel Penning and Claudius Cornelius Johannes Addink, Eindhoven, Netherlands, assignors, by mesne assignments, to General Electric Company, a corporation of New York Application March 14, 1932, Serial No. 598,830 In the Netherlands April 4, 1931

6 Claims. (Cl. 250—41.5)

This invention relates to an improved method of influencing an electric current by subjecting a gas or vapour-filled electric discharge tube to radiation. Various methods of converting variations in the intensity of light rays into variations in the intensity of an electric current are known. The method most in use is that in which the light rays are thrown on to the photoactive electrode of a photoelectric cell, which permits of the number of electrons emitted by the cathode being controlled.

The invention has for its object to provide an improved method of influencing an electric current by radiation in which a constructionally very simple electric discharge tube can be used.

In the method according to the invention use is made of an electric discharge tube comprising two cold electrodes connected to the same terminal of a current source and containing a gas or vapour the atoms (molecules) of which can be in a metastable state. By "metastable state" of an atom, or "metastable atom" we mean an atom in an excited state from which a return to the unexcited, or fundamental state of the atom does not take place spontaneously. The metastable state of the atom persists until some external influence brings the atom to a non-stable state from which a return to the fundamental, or unexcited state of the atom takes place spontaneously. This discharge tube is operated in such manner that metastable atoms of the gas or vapour are formed. The gas or the vapour in the proximity of one of said electrodes is then subjected to radiation by light containing frequencies adapted to be absorbed by metastable atoms (molecules).

It is found that due to the radiation of the gas or vapour in the proximity of one of said electrodes the discharge is displaced to the other electrode to an extent which increases according as the intensity of the rays is greater. Thus the current flowing through the first mentioned electrode decreases. This variation of the current can be observed, for example, by means of a milliammeter inserted in the wire lead for the first mentioned electrode. It is, of course, obvious that other devices responsive to variations in the current may be inserted.

The phenomenon may be explained as follows:

In the proximity of the electrode, electrons collide with gaseous atoms so that a number of these atoms are brought into a metastable state. A number of these metastable atoms are struck again by electrons so that ionization of the atoms may occur. By "ionization of the atoms" we mean a splitting of the atom into an ion and an electron. Now, if the tube is subjected to radiation in the manner above described the metastable atoms will absorb the light rays and be brought into a nonstable state from which they are apt to fall back very readily into the fundamental state. These metastable atoms are consequently not ionized and do not contribute to the discharge current or in other words the conductivity of the space adjacent one electrode and subjected to radiation decreases. Consequently the discharge current will flow through the other electrode. The discharge is thus so to say pushed back from the electrode which is subjected to radiation.

The effect realized can be increased by adding to the gas or the vapour of the discharge tube a small supply of a further gas or vapour the ionization of which is lower than the excitation potential of a metastable state of the atoms (molecules) of the first-mentioned gas or vapour. If the said gas consists, for example, of neon, argon may be added advantageously in a quantity comprised between 0.1 and 0.0001%, for example 0.001% of the quantity of neon.

This amplified effect may be explained as follows:

A number of metastable atoms of the main gas is formed in the proximity of the electrode. These atoms collide with atoms of the added gas and ionize it. A considerable part of the discharge current is therefore due to the ionization of the added gas. Now, if metastable atoms are removed on being subjected to radiation, the added gas will no longer contribute or merely contribute to a smaller extent to the current flowing through the tube or in other words in this case the conductivity of the space subjected to radiation is again decreased so that the discharge is again repelled from the electrode that is subjected to radiation. In addition, a slight contraction of the discharge is found to occur in this case.

The operation of the discharge tube can be rendered very stable by causing the electrode of the pair connected to the same terminal of the current source whose adjacent space is subjected to radiation to have a greater potential difference with the electrode of the tube connected to the opposite terminal of the current source as contrasted with the electrode of the pair which is not subjected to radiation. In this case the discharge will be contracted first on to the electrode that exhibits a greater potential difference with the electrode of opposite polarity. If, however, the adjacent space is subjected to radiation, the discharge will be transferred at least in part to the other electrode of the pair. This higher voltage can be obtained by connecting a separate source of voltage of low tension in series with the electrode subjected to radiation. It is also possible to connect a separate resistance in series with the electrode of the pair which is not subject to radiation so that during the operation of the discharge tube the electrode which is not provided with a separate series resistance receives a higher voltage relatively to the electrode of opposite polarity as contrasted with the electrode having a series connected resistance.

It is also possible to arrange one of the electrodes of the pair at a smaller distance from the electrode of opposite polarity as contrasted with the other electrode of the pair so that the discharge current will first flow through the electrode which is nearest to the electrode of opposite polarity. On this first mentioned electrode being subjected to radiation, the discharge is repelled again.

The light to the radiation of which the tube is subjected may be advantageously produce by an electric discharge struck in a gas or vapour filling in which the gas or vapour with which the discharge tube subjected to radiation is essentially filled is contained.

In order that the invention may be clearly understood and readily carried into effect one embodiment of the invention will now be described more fully with reference to the accompanying drawing, in which Figure 1 shows diagrammatically by way of example, a device comprising a discharge tube according to the invention with the corresponding circuit arrangement.

Figure 2:
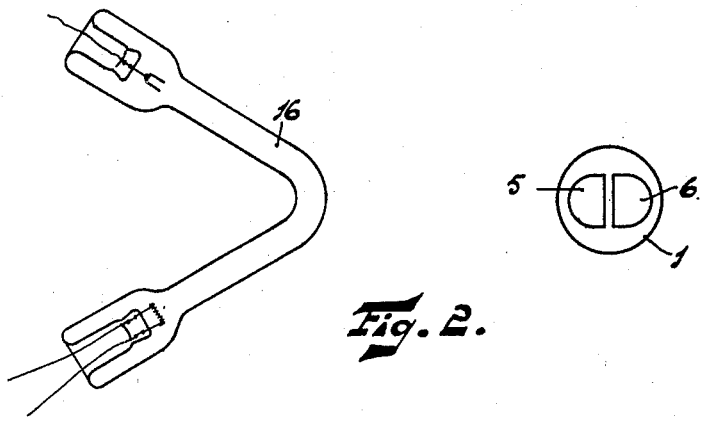

Fig. 2 is a sectional view of this device taken on the line II—II.

The discharge tube 1 shown in Figure 1 comprises a bulb of glass or similar material having arranged in it three cold electrodes. These electrodes comprise a metal plate-shaped anode 2 secured to a stem 4 by means of a supporting wire 3. Two cathodes 5 and 6, which as shown in Figure 2, are shaped in the form of semi-circular discs and are arranged adjacent each other are sealed into said tube 1. The cathodes 5 and 6 are carried upon supporting wires 7 and 8, respectively, sealed into a stem 9 and connected to wire leads 10 and 11 respectively. The discharge tube is filled with neon at a pressure of 20 millimeters. This neon has added to it 0.001% of argon. The ionization potential of argon is lower than the excitation potential of the first metastable state of the neon atoms.

The anode 2 is connected to the positive pole of a battery 12. The negative pole of this battery is connected through a regulating resistance 13 to the cathodes of the discharge tube 1. In addition, the wire lead 10 for said cathode 5 includes an ammeter 14 and the wire lead 11 for said cathode 6 a resistance 15 which may be, say 2000 ohms.

At some distance from the discharge tube 1 is placed a discharge tube 16 which is filled with neon and in which a positive column discharge can be struck.

The value of the battery 12 and of the resistance 13 is such that the cathode 5 of the discharge tube 1 is covered with a negative glow so that the cathode drop is normal. This glow tends by reason of a resistance 15 being included in the leading-in wire 11 to contract on to the cathode 5 rather than the cathode 6. If this cathode glow is subjected to radiation by neon light produced by the discharge tube 16, the glow is repelled from the cathode 5 to the cathode 6 and the more intense the radiation to which the glowing discharge of the cathode 5 is subjected, the greater is the extent to which it is repelled.

The intensity of the radiation may depend, for example, on the condition of the space comprised between the discharge tubes 1 and 16. If these tubes are arranged at some distance from each other and if a body moves through the space comprised between the two tubes, the rays of the discharge tube 16 are intercepted and the glowing discharge is displaced over the surface of the cathodes 5 and 6. This body may be, for example, a person so that the installation shown can be used for registrating the number of persons passing a given point. The displacement of the glowing discharge over the surface of the cathodes 5 and 6 results in a different distribution of the discharge current about the cathodes 5 and 6 so that the current which flows through the device 14 will vary according to the variations in the intensity of the radiation.

It is also possible for the source of rays to be arranged in a manner different from that shown in the drawing. Care should, however, be taken that one of the cathodes 5 and 6 is subjected to radiation to a greater extent as contrasted with the other of said cathodes 5 and 6. Such is also the case with the arrangement shown in Figure 1 of the drawing, as in this installation the light rays are essentially absorbed by the glowing discharge that covers the cathode 5.

Although the best results are obtained when the gas in the proximity of one of the cathodes 5 and 6 is subjected to radiation, it is also possible to cause the pair of electrodes connected to the same terminal of the current source to act as anodes and to subject the gas in the proximity of one of the anodes to radiation. In addition, one of the electrodes of the tube may be constituted by an incandescent cathode.

It may be mentioned that the above explanations of the phenomena occurring are given with all reserve. The applicant wishes not to be bound to the correctness of these explanations.

What we claim is:—

1. An apparatus for influencing the resistance of an electric circuit by means of light comprising a source of current, a light-sensitive element constituted by an electric discharge tube included in the circuit and comprising a plurality of electrodes two of which are of the same polarity, and a gaseous atmosphere the atoms of which are adapted to assume a metastable condition on the passage of current between said electrodes from said source, and a light source external to said light sensitive element to irradiate the tube in the region adjacent one of the electrodes of like polarity, said light principally displaying a wave length adapted to be absorbed by the gas atoms in their metastable condition.

2. An apparatus for influencing the resistance of an electric circuit by means of light comprising a source of current, a light-sensitive element constituted by an electric discharge tube included in the circuit and comprising a plurality of electrodes two of which are the same polarity and a gaseous mixture comprising a principal gas and a small proportion of added gas, the atoms of the principal gas being adapted to assume a metastable condition on the passage of current between said electrodes from said source and the ionization potential of the added gas being lower than the excitation potential of the atoms of the principal gas in metastable condition, and a light source external to said light sensitive element to irradiate the tube in the region adjacent one of the electrodes of like polarity, said light principally displaying a wave length adapted to be absorbed by the gas atoms in their metastable condition.

3. An apparatus for influencing the resistance of an electric circuit by means of light comprising a source of current, a light-sensitive element constituted by an electric discharge tube included in the circuit and comprising a plurality of electrodes two of which are of the same polarity but of different potential and a gaseous atmosphere, the atoms of which are adapted to assume a metastable condition on the passage of current between said electrodes from said source, and a light source external to said light sensitive element to irradiate the tube in the region adjacent one of the electrodes of like polarity, said light principally displaying a wave length adapted to be absorbed by the gas atoms in their metastable condition.

4. An apparatus for influencing the resistance of an electric circuit by means of light comprising a source of current, a light-sensitive element constituted by an electric discharge tube included in the circuit and comprising a plurality of electrodes two of which are of the same polarity, and a gaseous atmosphere the atoms of which are adapted to assume a metastable condition on the passage of current between said electrodes from said source, and a light source external to said light sensitive element to irradiate the tube in the region adjacent one of the electrodes of like polarity, said light principally displaying a wave length characteristic of the light emitted by the gas in said tube.

5. An apparatus for influencing the resistance of an electric circuit by means of light comprising a source of current, a light-sensitive element constituted by an electric discharge tube included in the circuit and comprising a plurality of electrodes two of which are of the same polarity and mounted at different distances from the other of said electrodes, and a gaseous atmosphere the atoms of which are adapted to assume a metastable condition on the passage of current between said electrodes from said source, and a light source external to said light sensitive element to irradiate the tube in the region adjacent one of the electrodes of like polarity, said light principally displaying a wave length adapted to be absorbed by the gas atoms in their metastable condition.

6. In combination a light-sensitive element constituted by an electric discharge tube included in the circuit and comprising a source of current, a plurality of electrodes two of which are of the same polarity, and a gaseous atmosphere the atoms of which are adapted to assume a metastable condition on the passage of current between said electrodes from said source, a light source external to said light sensitive element to irradiate the tube in the region adjacent one of the electrodes of like polarity, said light principally displaying a wave length adapted to be absorbed by the gas atoms in their metastable condition and a device connected to said tube responsive to the effect produced by such irradiation.

FRANS MICHEL PENNING.
CLAUDIUS CORNELIUS JOHANNES ADDINK.